Figure 1:
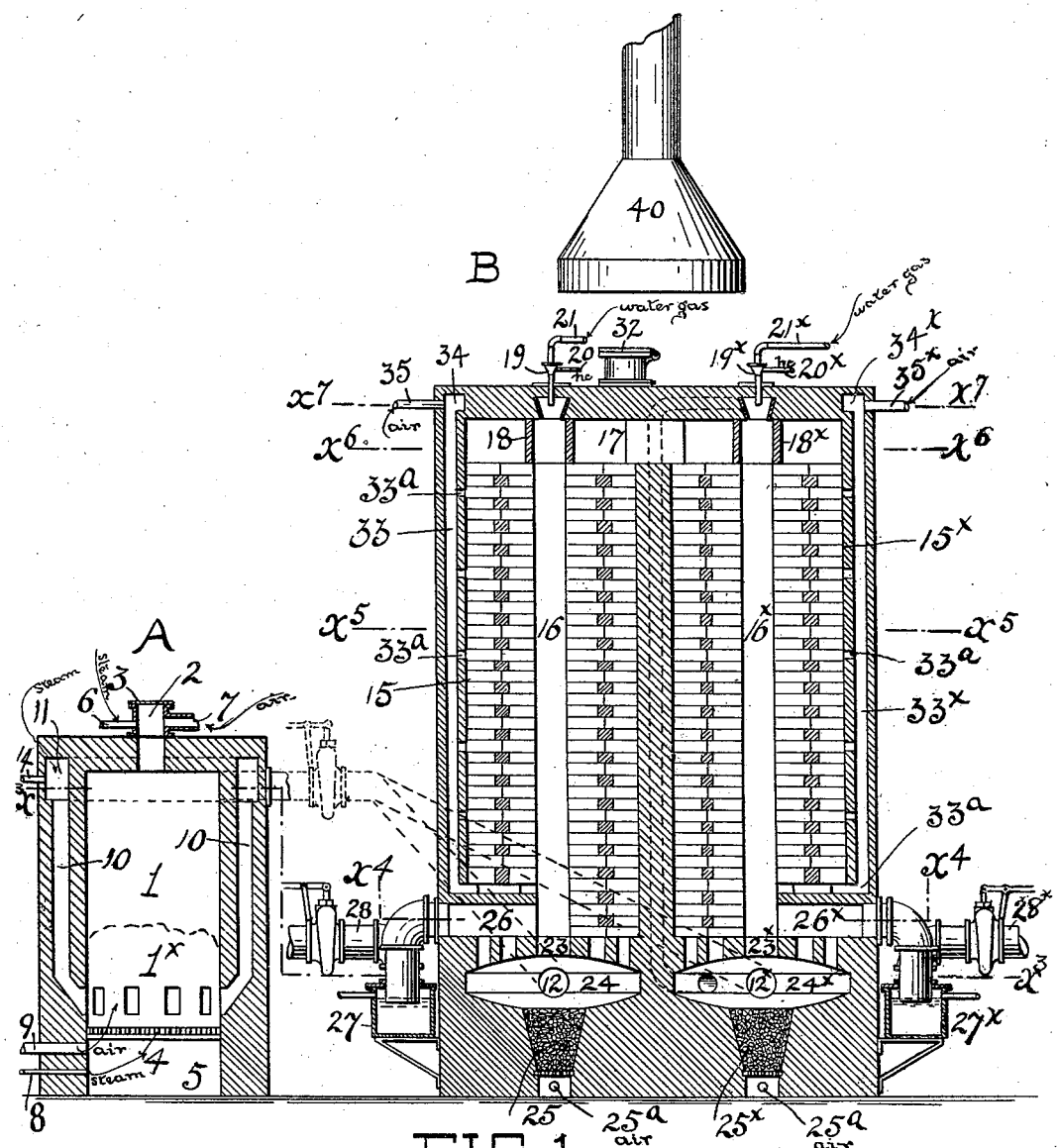

(No Model.) 3 Sheets—Sheet 1.

W. A. ALLEN.
APPARATUS FOR THE MANUFACTURE OF GAS.

No. 531,144. Patented Dec. 18, 1894.

WITNESSES: INVENTOR
Walter A. Allen
BY Henry Connett
ATTORNEY (No Model.)  3 Sheets—Sheet 2.

W. A. ALLEN.
APPARATUS FOR THE MANUFACTURE OF GAS.

No. 531,144. Patented Dec. 18, 1894.

WITNESSES:

INVENTOR
Walter A. Allen
BY
Henry Connett
ATTORNEY (No Model.) 3 Sheets—Sheet 3.

W. A. ALLEN.
APPARATUS FOR THE MANUFACTURE OF GAS.

No. 531,144. Patented Dec. 18, 1894.

WITNESSES:
Peter A. Ross
S. W. Kliman

INVENTOR
Walter A. Allen
BY Henry Connell
ATTORNEY

UNITED STATES PATENT OFFICE.

WALTER A. ALLEN, OF NEW YORK, N. Y.

APPARATUS FOR THE MANUFACTURE OF GAS.

SPECIFICATION forming part of Letters Patent No. 531,144, dated December 18, 1894.

Application filed August 6, 1894. Serial No. 519,609. (No model.)

*To all whom it may concern:*

Be it known that I, WALTER A. ALLEN, a citizen of the United States, residing in the city, county, and State of New York, have invented certain new and useful Improvements in Apparatuses for the Manufacture of Gas, of which the following is a specification.

My invention relates to improvements in apparatuses for the manufacture of gas, and particularly of illuminating gas, from coal, liquid hydrocarbons and water; and the main purpose of the invention is to reduce the cost of the manufacture, and to produce an illuminating gas of high candle power from a small amount of material by carefully utilizing all of the volatile components of the oil or liquid hydrocarbons for carbureting purposes.

It has been the practice to carburet crude water gas by atomizing liquid hydrocarbons with steam in a heated chamber to which the crude water gas is admitted, the mixing of the particles from the atomizer with the gas being effected in such cases under unfavorable conditions. The steam forms an envelope about the particles of hydrocarbon and thus prevents the heat from effecting in them the necessary atomic change to enable their elements to separate and recombine with the gas in the passage through the heated checkerwork of the chamber. Consequently, when the protected particles meet a highly heated surface or come into direct contact with a solid, the envelope is broken and much of the hydrocarbon is precipitated with corresponding loss as an illuminant. The steam requires for its decomposition a much higher temperature than the hydrocarbon and if not decomposed—and it seldom is—it carries away the heat rapidly and without benefit. Indeed, it is injurious to the hydrocarbons and it is practically impossible to maintain a proper temperature in the combining chamber for any length of time while making a run. Furthermore, under such conditions, the steam or aqueous vapor carries out of the fixing and combining chamber some of the heavier products of the liquid hydrocarbon protected against the heat by the steam and these particles are not utilized by combination with the crude gas. As soon as the temperature of these products is lowered the heavier hydrocarbons throw down tarry matter and carry with them many of the lighter products which would otherwise have been utilized as illuminants. On the other hand, if the hydrocarbons of the higher series meet high temperature, or even the proper temperature, too suddenly, they will break up and precipitate anthracene or some other of the higher series or solids, and these are not only lost as illuminants but they tend to clog up the apparatus.

It has also been a common but objectionable practice to admit the hydrocarbon vapor into the combining and fixing chamber at a point where all of the different series of hydrocarbons, from methane ($CH^4$) of the lower series up to the highest, or solids, meet the some temperature, and are subjected to the same time and travel. This treatment, if it should be adapted to the higher series, will be disastrous to the lower series and these hydrocarbons will be broken and precipitate lamp black or free carbon. On the other hand, if the temperature be adapted to the lower series of hydrocarbons, no chemical change will be produced in the higher series.

Another feature which I deem objectionable in the ordinary methods and apparatuses is the loss of heat at the purge valve in blowing up, when the hot products of combustion pass directly into the air or through reheating devices. This heat can be utilized in the apparatus to a considerable extent.

Another feature of the ordinary methods which I deem objectionable, is the custom in such apparatuses as have double chambers connected below, of attempting to drive, or "wash" the heat downward.

My invention seeks to obviate the above objections in process and apparatus.

Figure 2:
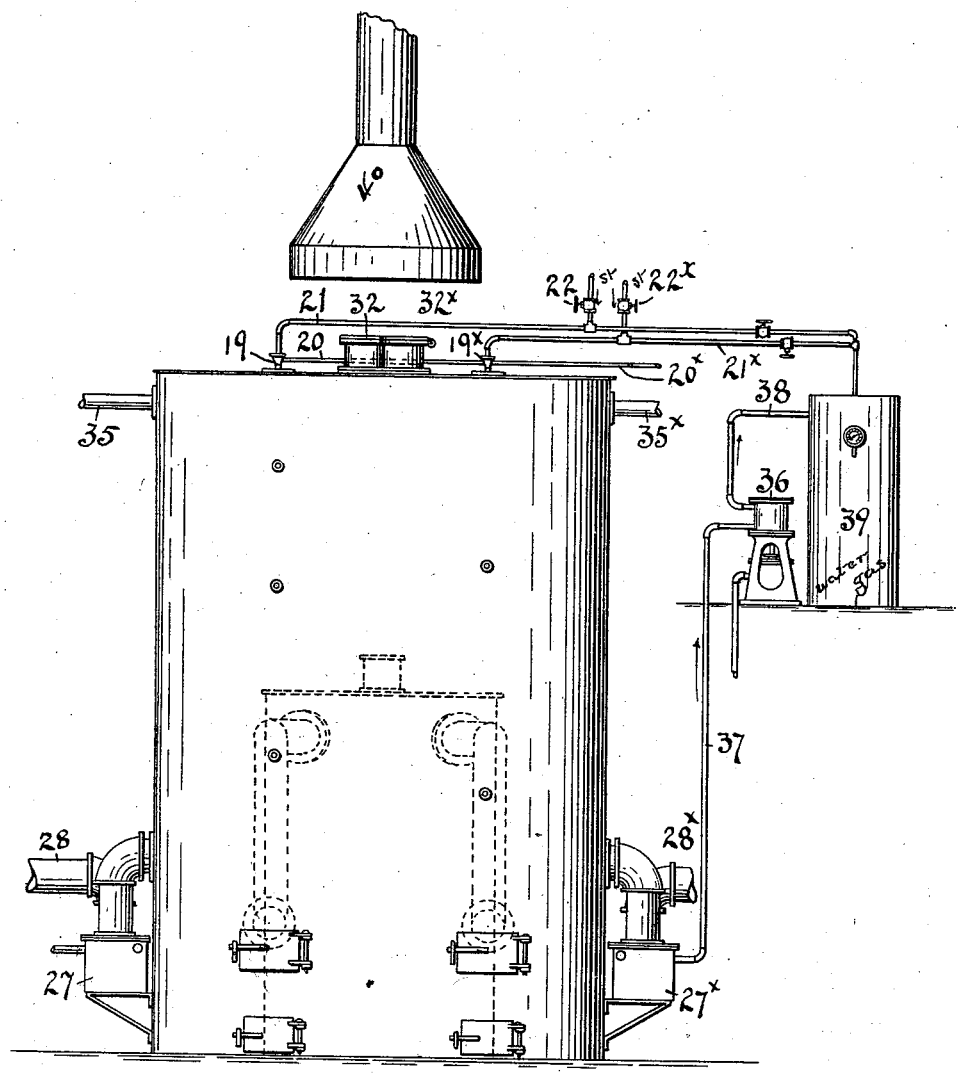
Figure 4:
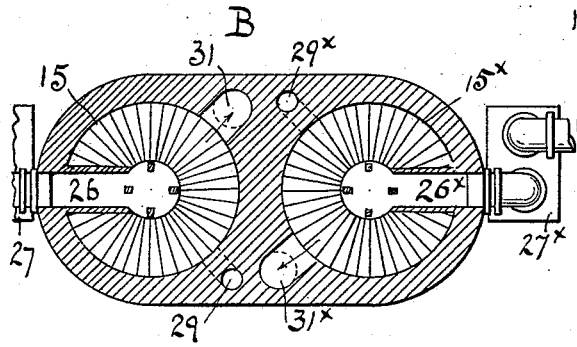
Figure 5:
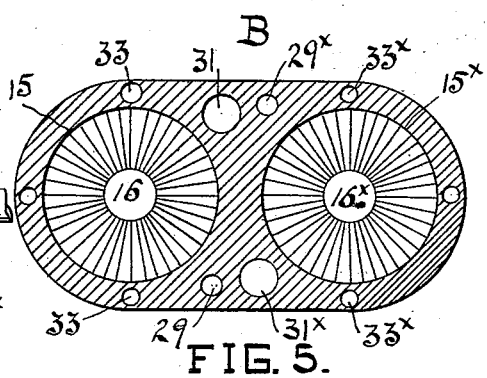
Figure 6:
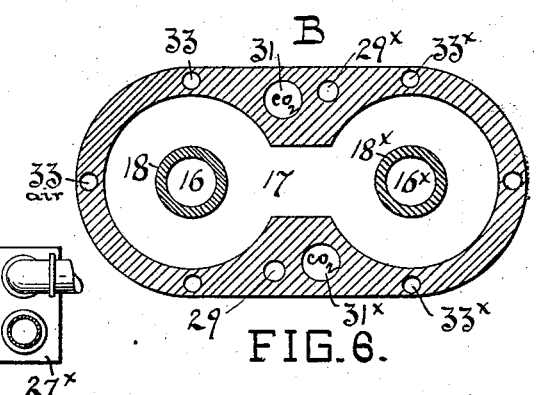
Figure 7:
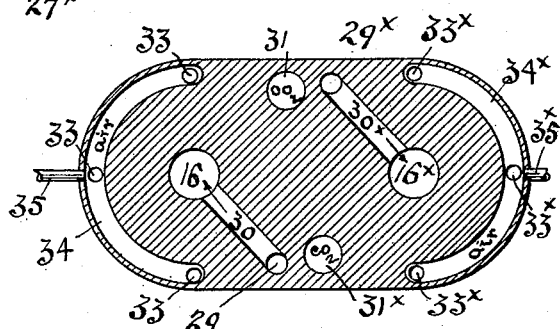
Figure 3:
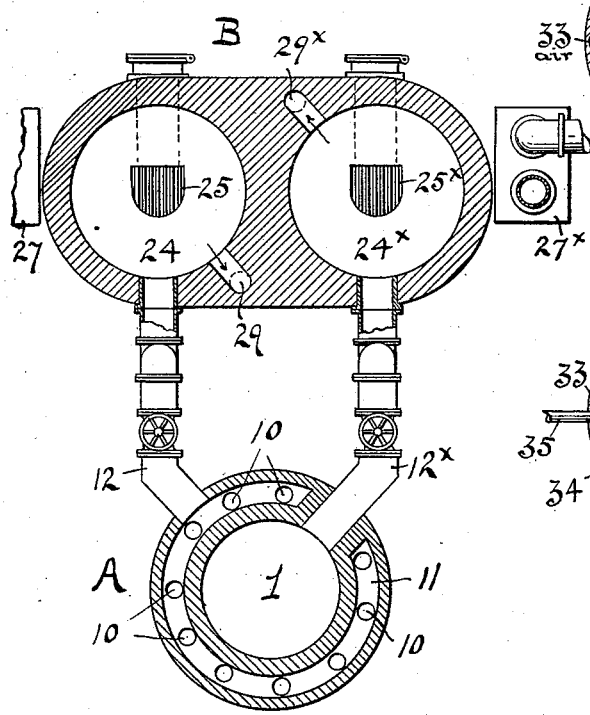

In the accompanying drawings, which illustrate an embodiment of my apparatus, Figure 1 is a vertical mid-section of the generator and the combining and fixing apparatus, the connections being indicated in dotted lines. This view does not show the two parts in their preferred relative positions. Fig. 2 is a side elevation of the combining and fixing apparatus, the generator behind it being indicated in dotted lines. Fig. 3 is a horizontal section of the generator and fixing apparatus in substantially the plane indicated by line $x^3$ in Fig. 1. Figs. 4, 5, 6 and 7 are horizontal sections of the combining and fixing apparatus taken in the planes indicated, respectively by the lines $x^4$, $x^5$, $x^6$ and $x^7$, in Fig. 1.

A represents the generator, as a whole, and B the combining and fixing apparatus as a whole. These will be, by preference and for convenience arranged with respect to each other as seen in Fig. 3. The arrangement seen in Fig. 1 is merely for convenience of illustrating both parts, A and B, in one figure. For convenience also the generator and fixing apparatus are represented with their bottoms on the same level, but this is not essential. The generator will usually be set at a lower level so as to bring the connecting conduits into a horizontal position.

The generator will be built of refractory material inclosed in a metal skin or casing.

1 is the generating chamber, to which coal is admitted at an inlet, 2, provided with a tight cover, 3. The coal rests on a grate, 4, above which is the combustion chamber, $1^\times$, and under which is the ash-pit, 5. Steam is admitted to the chamber 1 through a pipe, 6, which taps the fuel inlet, and an air-blast is admitted at an inlet, 7, which also taps the fuel inlet. Below the grate there is an inlet pipe, 8, for steam, and an inlet pipe, 9, for air under tension. Flues, 10, lead from the combustion chamber up through the walls into an annular flue, 11, at the upper part of the generator. A conduit, 12, (see Fig. 3) receives the gases from the flue 11 and carries them off, and a conduit, $12^\times$, receives the gases from the upper part of chamber 1 and carries them off. A steam inlet pipe 14 is provided to supply steam to the annular flue 11.

The combining and fixing apparatus, B, is constructed of refractory materials, with an oval cross-section and has a casing of sheet metal. This apparatus has two upright fixing chambers, 15 and $15^\times$, (see Fig. 5) here represented as circular in cross-section. Each fixing chamber is filled with checker-work, so built in as to leave atomizing chambers, 16 and $16^\times$ in their axes. The checker-work ends before it reaches the top of the chambers, (see Fig. 1) namely, at the top of the partition which separates the fixing chambers, and above this there is a space, 17, (see Fig. 6) through which the chambers are connected. The atomizing chambers 16 and $16^\times$ are continued up through the space 17 by tubes, 18 and $18^\times$, of refractory material which extend up to the top or roof wall of the apparatus and receive at their respective upper ends atomizers, 19 and $19^\times$, to which liquid hydrocarbon is supplied by pipes, 20 and $20^\times$, respectively, and crude water gas under tension by pipes, 21 and $21^\times$, respectively; or, where for any reason gas cannot be supplied at the moment, steam may be supplied by way of branch pipes, 22 and $22^\times$, (Fig. 1.)

Under perforated arches, 23 and $23^\times$, at the bottoms of the respective chambers 15 and $15^\times$, are combustion chambers, 24 and $24^\times$, with fire-boxes, 25 and $25^\times$, below them. The conduit 12, (see Fig. 3) connects the generator with the chamber 24, and the conduit $12^\times$ connects the generator with the chamber $24^\times$. Outlet conduits, 26 and $26^\times$, for the gas, lead the latter from the lower part of the respective fixing chambers 15 and $15^\times$, to the usual seals, 27 and $27^\times$, from whence it flows for storage and use by way of the respective pipes, 28 and $28^\times$. Flues, 29 and $29^\times$, lead from the respective chambers 24 and $24^\times$, (Fig. 3) up through the wall to the top of the same and then connect by branches, 30 and $30^\times$, (see Fig. 7) with the upper ends of the respective atomizing chambers.

Flues, 31 and $31^\times$, lead from the lower portions of the respective chambers 15 and $15^\times$, (see Fig. 4) up through the wall of the apparatus to the respective purge valves, 32 and $32^\times$, (Figs. 1 and 2.)

Hot air flues, 33 and $33^\times$, extend up through the walls about the respective fixing chambers and terminate in parti-annular flues, 34 and $34^\times$, respectively, (see Fig. 7) at the top of the apparatus. The upright flues connect at the bottom, and at intervals in their length, with the respective fixing chambers, as at $33^a$, and air-inlet pipes, 35 and $35^\times$, supply air to the curved flues 34 and $34^\times$, respectively, and through them and the upright flues, to the fixing chambers.

The various pipes and conduits are supplied with suitable cocks and cut-off valves as indicated in the several figures.

At the right in Fig. 2 is seen the holder for compressed crude water gas employed for atomizing the liquid hydrocarbon, and the means for compressing the gas. The compression pump, 36, somewhat diagrammatically represented, receives gas from a seal by way of a supply pipe, 37, and forces it through a pipe, 38, into the holder, 39. The atomizers are supplied from this holder. Of course the holder, 39, and its pump, may be placed where they will be most convenient.

The operation of the apparatus is as follows: Fire is kindled in the generator, which is then charged with fuel and the full inlet closed. The fire will be built on the grate so that the fuel ignites from beneath, and the air turned on at the inlet 9 below the grate. All cocks, valves and outlets will be closed except the valve in the conduit $12^\times$, the purge valve 32, the air-inlets 35 and $35^\times$, and the inlets for air under the fire-boxes 25 and $25^\times$. The fuel in these latter will be kept, normally, at incandescence. The products of combustion from the generator flow through the conduit $12^\times$ to the chamber $24^\times$, in the apparatus B, thence up through the checker-work in chamber $15^\times$, thence through the space 17 to the top of chamber 15, thence down through the checker-work in this chamber to the lower extremity of the flue 31, and thence up through this flue to the open purge valve 32, whence it escapes. In its passage through the flue 31, it gives up a large part of its heat to the mass of brick-work about the chambers containing the checker-work. Air is admitted in regulated quantities at the air-inlets 35 and $35^\times$, to aid in the combustion of the gases passing through the chambers.

When the "blowing up" has been completed the chamber $15^\times$ and its checker-work, will be more highly heated than chamber 15 and its contents.

The next operation is to make a "run" of gas. All of the air is cut off, the valve in the conduit $12^\times$ is closed and that in conduit 12 opened. The purge valve 32 is closed and the gas outlet $28^\times$ opened. The cocks in the pipes supplying compressed water-gas and liquid hydrocarbon to the atomizer 19 are opened, and the steam turned on at the inlet 6 of the generator. The steam flows down through the hot fuel in the generator, is decomposed, and the crude water gas thus generated flows up through the flues 10 to flue 11, and thence by way of the open conduit 12, to the receiving chamber 24. From this chamber the gas flows up through chamber 15, which is less highly heated than chamber $15^\times$. In its upward flow it meets the descending hydrocarbon vapor from the atomizer 19. This vapor descends in the chamber 15 to an extent dependent on its volatility, or the temperature at which it is adapted to combine with the gas, that of lowest volatility descending lowest. Should any vapor descend into the chamber 24, the incandescent fuel of the fire 25 will subject it to the proper temperature.

The carbureted gas passes from the chamber 15 over into the chamber $15^\times$, and down through this more highly heated chamber where it is fixed. The gas finally flows off through the passage or flue $26^\times$, to the seal $27^\times$, and thence out by way of the pipe $28^\times$.

A portion of the hot gas from the generator flows up through the flues 29 and 30, to the inlet of the vaporizer 19 and mingles with the vapor of hydrocarbon.

After the run has been carried as far as desirable, it is arrested and the apparatus again heated. This second blowing up operation is the reverse of the first. The fire in the generator is kindled at the top and the air-blast admitted at the inlet 7. The products of combustion and gases flow up through the flues 10 to the flue 11, and thence by way of the conduit 12 to the chamber 24. Thence they flow up through chamber 15, down through chamber $15^\times$, and up through flue $31^\times$ to the open purge valve $32^\times$. After the chambers are heated in this way a run is made. All of the air is cut off, the valve in conduit 12 closed, the purge valve $32^\times$ closed, the gas outlet 28 opened and the pipes leading compressed gas and hydrocarbon to the atomizer $19^\times$ are opened. Steam is admitted under the grate, at 8, and also to the flue 11 at the inlet 14. The crude water-gas flows through the open conduit $12^\times$ to the receiving chamber $24^\times$, and thence up through the chamber $15^\times$, where it mixes with hydrocarbon vapor from the vaporizer $19^\times$. From the space or chamber 17 the gas flows down through the more highly heated chamber 15 to the passage 26, and finally passes off at the outlet 28. Some of the hot gas from the chamber $24^\times$, flows up to the vaporizer inlet by way of the flues $29^\times$ and $30^\times$. This completes the cycle of operations and it is repeated indefinitely.

It will be noted that in the cycle of operations the "blowing up" operation is reversed, as to the flow of the gases, at each successive operation and the "run" succeeding each blowing up is also reversed alternately. In blowing up, the gases pass first upwardly and then downwardly through the chambers 15 and $15^\times$, and then flow upwardly to the purge valve through a flue in the brick-work. Thus their heat is utilized to the fullest extent. In making the run, the gas always passes first upwardly and then downwardly through the chambers 15 and $15^\times$ and in a direction opposite to that of the products of combustion, thus passing through the less highly heated chamber first.

The hot water-gas from the receiving chamber is drawn up through the flue 29 or $29^\times$ by the suction of the atomizer and mixes with the vapor of hydrocarbon at the atomizer, thus diffusing the vapor and thoroughly mixing it with hot gas at this point.

The fires of incandescent fuel, coke or coal, under the receiving chambers 24 and $24^\times$ serve, as stated to supply any loss of heat at the bottoms of the combining and fixing chambers.

The fire-boxes 25 and $25^\times$ will be supplied with suitable inlets, $25^a$, for air-blasts, but these blasts should be cut off in making a run.

Over the purge valves may be placed a hood and pipe, 40, to carry off the products of combustion.

The main object in supplying hot water gas to the atomizer is to increase the volume of gases and vapors entering at the tops of the chambers 16 and $16^\times$ and cause a lateral expansion of the vapors into the interstices of the checker-work; and the object in forming these chambers in the checker-work is to permit of such free lateral expansion at all points in the height of the chambers 15 and $15^\times$.

Having thus described my invention, I claim—

1. In an apparatus for carbureting and fixing gas, the combination of a generator, two receiving chambers 24 and $24^\times$, each connected to the generator, two upright combining and fixing chambers 15 and $15^\times$, arranged over the respective receiving chambers and filled with checker-work having chambers 16 and $16^\times$, a chamber or space 17, connecting the chambers 15 and $15^\times$ at their upper ends, and atomizers 19 and $19^\times$, arranged over the respective chambers 16 and 16ˣ, substantially as set forth.

2. An apparatus for making gas, comprising a generator, a receiving chamber 24, a conduit connecting the generator with said receiving chamber, an upright combining and fixing chamber 15, arranged over the chamber 24, an upright combining and fixing chamber 15ˣ, connected at its upper end with the chamber 15, an upright flue 31ˣ, in the wall about the chambers 15 and 15ˣ, said flue connecting at its lower end with the bottom of the chamber 15ˣ, whereby the gases are compelled to pass first upwardly through the chamber 15 and thence downwardly through chamber 15ˣ, and a purge valve 32ˣ, on the upper end of the flue 31ˣ, substantially as set forth.

3. An apparatus for carbureting and fixing water gas, comprising a receiving chamber for the crude gas, an upright combining and fixing chamber arranged over the receiving chamber and provided with checker-work, an atomizer arranged over the combining and fixing chamber and having an inlet into the same, and a flue for hot water-gas extending up through the brick-work about the combining chamber, said flue connecting at its lower end with the receiving chamber and at its upper end with the atomizer inlet, substantially as set forth.

4. In an apparatus for carbureting and fixing water gas, the combination with a generator, a receiving chamber 24, for the crude gas adapted for communication with the generator, an upright combining chamber 15, above the receiving chamber and containing checker-work arranged to form a central chamber 16, and an atomizer 19, arranged over and connecting with the chamber 16, whereby hydrocarbon in the form of vapor may be injected downwardly into the upper end of the chamber 16, of a fire-box or furnace 25, arranged at the bottom of the receiving chamber 24, substantially as and for the purposes set forth.

5. In an apparatus for making gas, the combination of a generator, two receiving chambers each adapted for independent communication with the generator, and a combining-chamber and a fixing-chamber, arranged over the respective receiving chambers, and connected together at their upper ends, said fixing and combining-chambers being each provided with a gas-outlet at its lower end, substantially as set forth.

In witness whereof I have hereunto signed my name in the presence of two subscribing witnesses.

WALTER A. ALLEN.

Witnesses:
HENRY CONNETT,
JAS. KING DUFFY.